(12) United States Patent
Rowley

(10) Patent No.: US 10,246,221 B2
(45) Date of Patent: Apr. 2, 2019

(54) STACKABLE CONTAINER WITH PROTRUSION AND GROOVE

(71) Applicant: Dean Rowley, Bruxelles (CA)

(72) Inventor: Dean Rowley, Bruxelles (CA)

( * ) Notice: Subject to any disclaimer, the term of this patent is extended or adjusted under 35 U.S.C. 154(b) by 109 days.

(21) Appl. No.: 15/353,991

(22) Filed: Nov. 17, 2016

(65) Prior Publication Data

US 2018/0134446 A1 May 17, 2018

(51) Int. Cl.
| | |
|---|---|
| *B65D 21/032* | (2006.01) |
| *B65D 21/02* | (2006.01) |
| *B65D 41/02* | (2006.01) |
| *B65D 47/06* | (2006.01) |
| *B60K 15/03* | (2006.01) |

(52) U.S. Cl.
CPC .......... *B65D 21/023* (2013.01); *B60K 15/03* (2013.01); *B65D 41/02* (2013.01); *B65D 47/06* (2013.01)

(58) Field of Classification Search
CPC .......... B65D 21/0231; B65D 21/023; B65D 21/0209; B65D 21/0222; B65D 21/0261; B65D 1/0261
USPC .......... 215/375, 377; 206/509, 508
See application file for complete search history.

(56) References Cited

U.S. PATENT DOCUMENTS

| | | | | | |
|---|---|---|---|---|---|
| 829,477 | A | * | 8/1906 | Kruse | 206/508 |
| 3,419,184 | A | * | 12/1968 | Asenbauer | B65D 21/0222 |
| | | | | | 206/508 |
| 3,586,204 | A | * | 6/1971 | Roper | B65D 7/12 |
| | | | | | 206/512 |
| 3,780,899 | A | * | 12/1973 | Roper | B65D 7/36 |
| | | | | | 220/4.04 |
| 4,609,106 | A | * | 9/1986 | Gentili | B65D 1/12 |
| | | | | | 206/509 |
| 5,699,925 | A | * | 12/1997 | Petruzzi | B65D 21/0204 |
| | | | | | 206/508 |
| 5,779,051 | A | * | 7/1998 | Boutin | B65D 21/0235 |
| | | | | | 206/504 |

* cited by examiner

*Primary Examiner* — Stephen Castellano
(74) *Attorney, Agent, or Firm* — Adrian D. Battison; Ade + Company Inc.; Ryan W. Dupuis

(57) ABSTRACT

A container features a pair of stacking features on its top and bottom walls enabling a plurality of such containers to be disposed in a vertically stacked configuration. One of these stacking features is a protrusion with a tip spaced from an outer surface of the respective wall and opposite sides depending from the tip on either side thereof towards the wall's outer surface, and the other one is a groove with a base recessed from an outer surface of the respective wall and opposite sides of the groove extending from the base on either side thereof towards the wall's outer surface. The groove of one such container is thus arranged to matingly receive the protrusion of another such container so that the two containers are interconnectable in the vertically stacked configuration.

8 Claims, 7 Drawing Sheets

STACKABLE CONTAINER WITH PROTRUSION AND GROOVE

FIELD OF THE INVENTION

The present invention relates to a container of a type with an arrangement which allows the container to be stacked vertically with another container of the same type.

BACKGROUND

Storage containers are convenient for storing materials especially those which flow, whether for example in a particulate or a liquid form.

Further, as such containers are commonplace, it is desirable to be able to arrange these in an efficient storage configuration so as to minimize an amount of surface area in a storage space which the containers occupy. One way in which to accomplish this is to provide the containers with an arrangement which allows them to be stacked vertically one on top of the other.

SUMMARY OF THE INVENTION

According to another aspect of the invention there is provided a container comprising:

a top wall, a bottom wall, and at least one peripheral side wall spanning therebetween in substantially upstanding condition, the top and bottom and at least one peripheral side walls collectively defining an interior volume of the container;

the top wall and the at least one peripheral side wall being unitary;

the top wall and the at least one peripheral side wall having substantially uniform wall thickness;

the bottom wall defining a horizontal plane so as to be adapted for resting on a support surface;

an opening defined in one of the top wall, the bottom wall and the at least one peripheral side wall for accessing the interior volume of the container;

a protrusion carried on one of the top wall and the bottom wall with a tip spaced from an outer surface of said one of the top wall and the bottom wall and opposite sides of the protrusion depending from the tip on either side thereof towards the outer surface of said one of the top wall and the bottom wall;

a groove carried on the other one of the top wall and the bottom wall with a base recessed from an outer surface of said other one of the top wall and the bottom wall and opposite sides of the groove extending from the base on either side thereof towards the outer surface of said other one of the top wall and the bottom wall;

a respective one of the protrusion and the groove which is carried on the bottom wall following a closed annular path about the bottom wall;

a respective one of the protrusion and the groove which is carried on the top wall following a closed annular path about the top wall and being spaced inwardly from where the top wall transitions to the at least one peripheral side wall;

the top wall having opposite inclined portions located on an outer side of the respective one of the protrusion and the groove that is carried on the top wall so as to be located intermediate the respective one of the protrusion and the groove that is carried on the top wall and where the top wall transitions to the at least one peripheral side wall;

each one of the opposite inclined portions of the top wall depending downwardly and outwardly from the respective one of the protrusion and the groove that is carried on the top wall to where the top wall-transitions to the at least one peripheral side wall;

the groove of a first one of a plurality of the container being arranged for matingly receiving the protrusion of a second one of the plurality of the container such that the first one and the second one of the plurality of the container are interconnectable in a vertically stacked configuration; and in the vertically stacked configuration, the plane defined by the bottom wall for resting on the support surface being spaced from the inclined portions of the top wall thereunder.

As such, the protrusion of one container is arranged for nesting within the groove of another container so that the containers are held in fixed relation to one another by mating of the protrusion and groove thereby forming a stable vertical stack. Each one of the protrusion and groove comprises two side surfaces on either side of the respective one of the tip and the base which cooperate in butting engagement with the side surfaces of the other so as to maintain one container in fixed relation relative to the other in a direction transverse to the direction of extent of the protrusion and groove.

Preferably each of the protrusion and the groove follow a closed annular path about the respective one of the top wall and the bottom wall. Use of the term "annular" is not intended to limit the shape of the path, and thus the path may be for example rectangular (e.g., square) or elliptical (e.g. circular).

The protrusion and groove may be continuous so that each extends along the closed annular path.

Alternatively, the protrusion and the groove may each comprise a plurality of segments each extending along a portion of the closed annular path so that the segments collectively form the closed annular path.

Preferably each of the tip of the protrusion and the base of the groove along a length thereof defines a common stacking plane.

Thus, in the vertically stacked configuration the stacking plane of the protrusion and the stacking plane of the groove are substantially coplanar.

In one arrangement the outer surface of the bottom wall is inclined on either side of a central line extending longitudinally of the bottom wall so as to form a tip along said central line, and the container includes a plurality of feet at the bottom wall on either side of said central line with bottoms of the feet defining a common plane with the tip of the outer surface of the bottom wall.

Thus the feet are suited for resting on a support surface such as a room floor while being arranged so as to not interfere with a container therebeneath in the vertically stacked configuration.

Preferably the common plane of the feet and tip of the bottom wall and the stacking plane are parallel.

In one arrangement the outer surface of the top wall is inclined on either side of a central line extending longitudinally of the top wall so as to form a tip along said central line such that the bottoms of the feet of the first one of the plurality of the container are spaced from the outer surface of the top wall of the second one of the plurality of the container in the vertically stacked configuration.

Thus the feet bottoms do not contact the top wall of the container therebeneath in the vertically stacked configuration.

A central portion of each of the bottom wall of the first one of the plurality of the container and the top wall of the second one of the plurality of container may be arranged for butting engagement one with the other in the vertically stacked configuration. This central portion comprises the tip of the respective one of the top wall and the bottom wall.

It will be appreciated that the opening is located in one of the top wall, the bottom wall, and the plurality of side walls. Typically the opening is located in one of the side walls.

Typically there is provided a handle formed recessed into the top wall. In this arrangement the handle does not protrude beyond the outer surface of the top wall so as to not interfere with a container thereover in the vertically stacked configuration. Typically the handle is located within the path followed by the respective one of the protrusion and the groove at the top wall.

In one arrangement the protrusion is located at the top wall and the groove at the bottom wall. In this arrangement the container preferably includes feet on the bottom wall that are distinct of the groove for example like those described above.

In another arrangement the groove is located at the top wall and the protrusion at the bottom wall. In this arrangement the protrusion may define a footing of the container for resting on a support surface such that feet at the bottom wall which are additional to the protrusion may not be required.

The arrangement of container described hereinbefore may be applied to a container of the type for storing fuel such as gasoline, and therefore the container may further include a spout and a cap which are connected at the opening. The spout and cap are cooperatively arrangeable in a first closed position where the spout is located in the interior volume of the container which is not communicated with an exterior of the container such that contents stored within the container remains contained therein, and in a second pouring position where the spout is mounted on the cap so that the contents may be evacuated from the interior volume of the container by pouring.

BRIEF DESCRIPTION OF THE DRAWINGS

One arrangement of the invention will now be described in conjunction with the accompanying drawings in which.

In the drawings like characters of reference indicate corresponding parts in the different figures.

DETAILED DESCRIPTION

Figure 1:
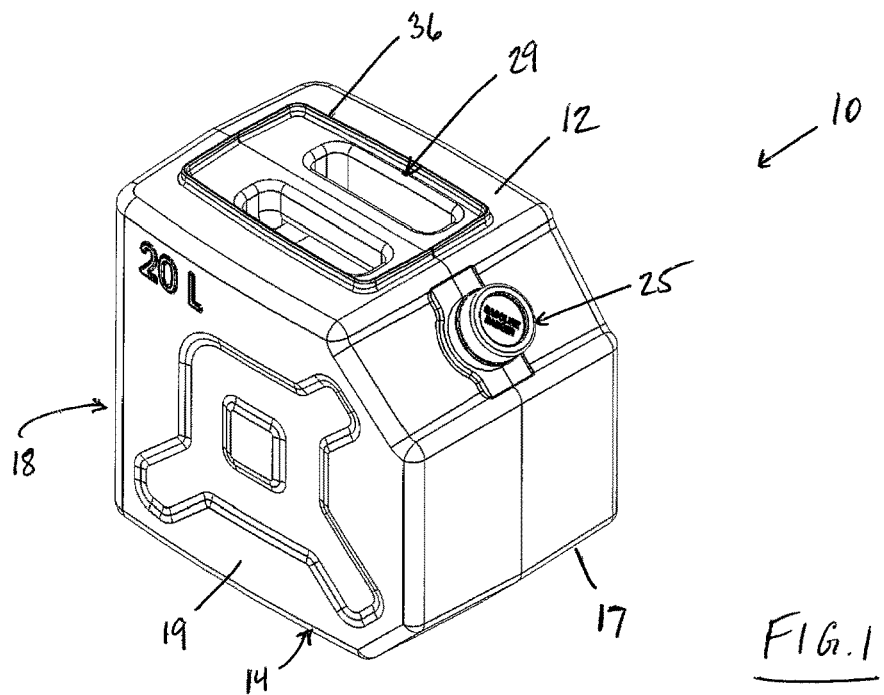
FIG. 1 illustrates from the top and one side a perspective view of container according to the present invention.
Figure 2:
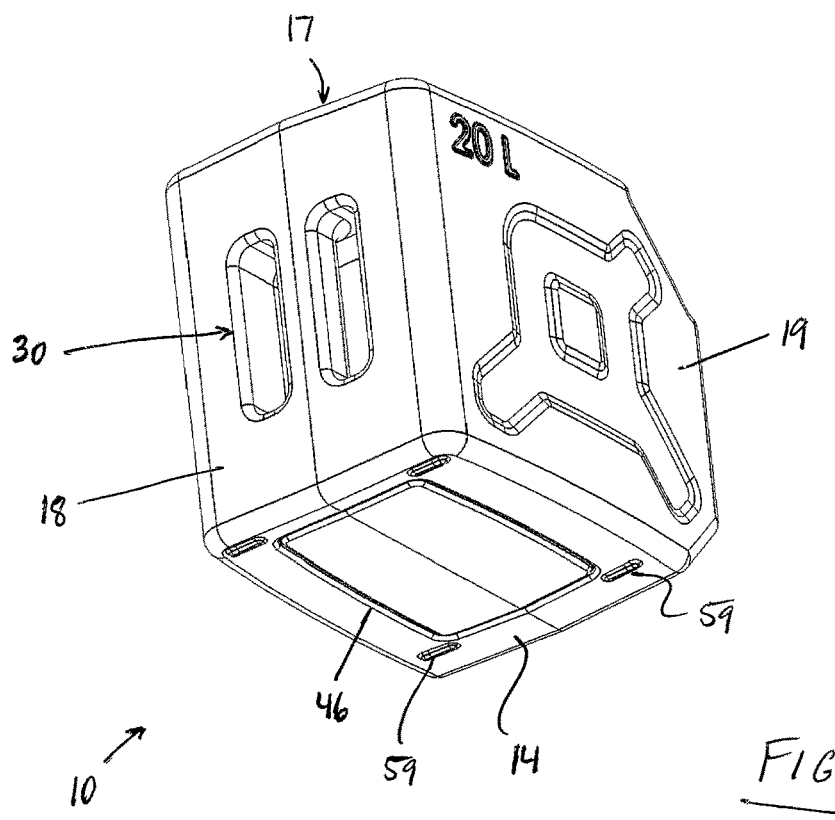
FIG. 2 illustrates another perspective view of the container of FIG. 1 from the bottom and one side thereof.
Figure 3:
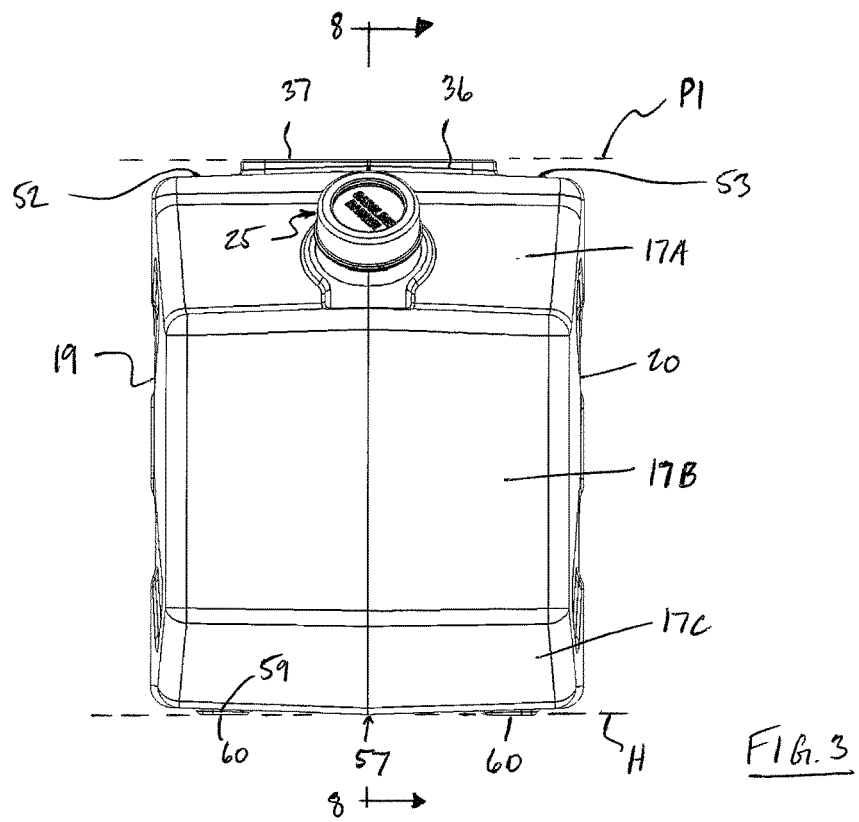
FIG. 3 is a plan view from a top of the container of FIG. 1.
Figure 4:
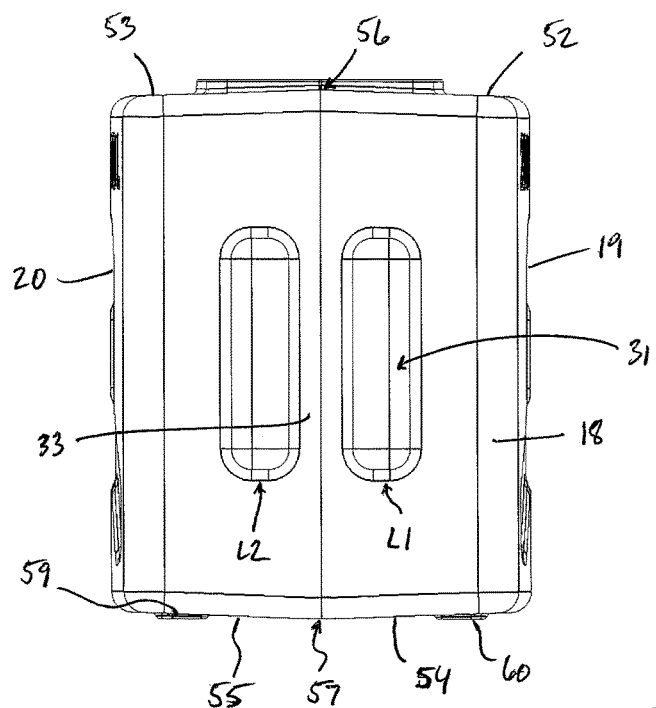
FIG. 4 is a plan view from a bottom of the container of FIG. 1.
Figure 5:
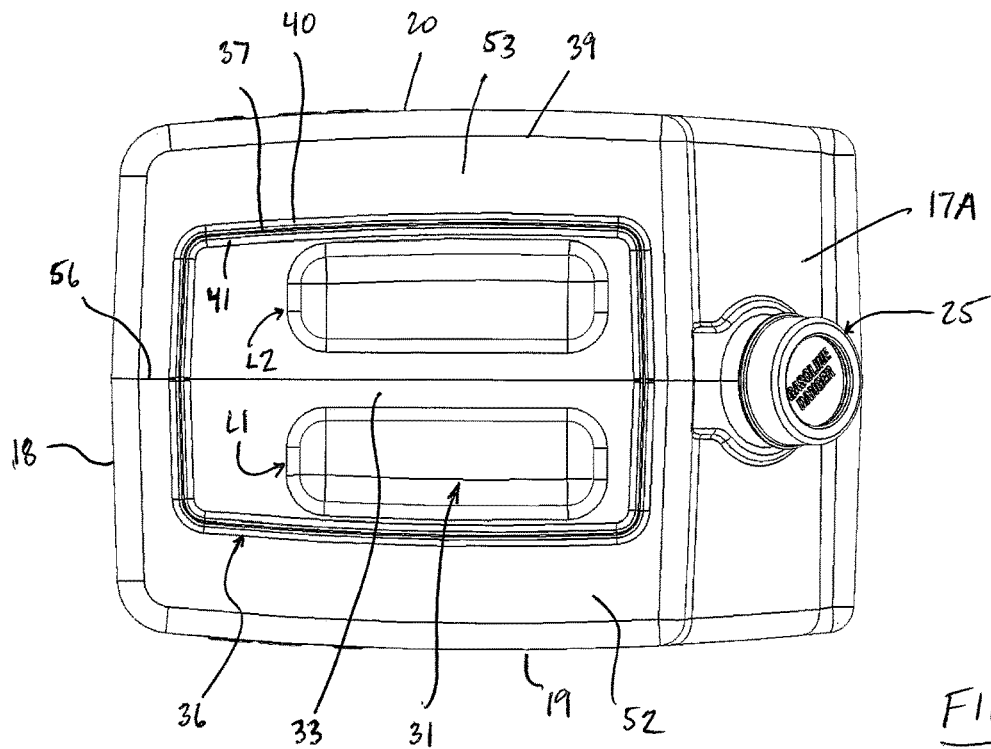
FIG. 5 is an elevation view from a front of the container of FIG. 1.
Figure 6:
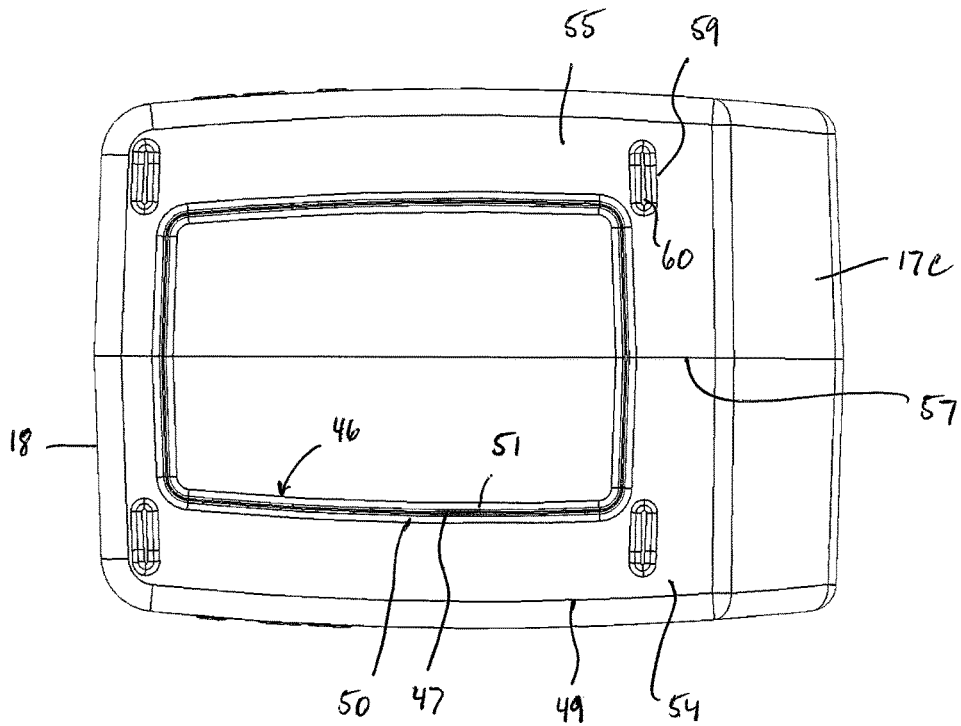
FIG. 6 is an elevation view from a rear of the container of FIG. 1.
Figure 7:
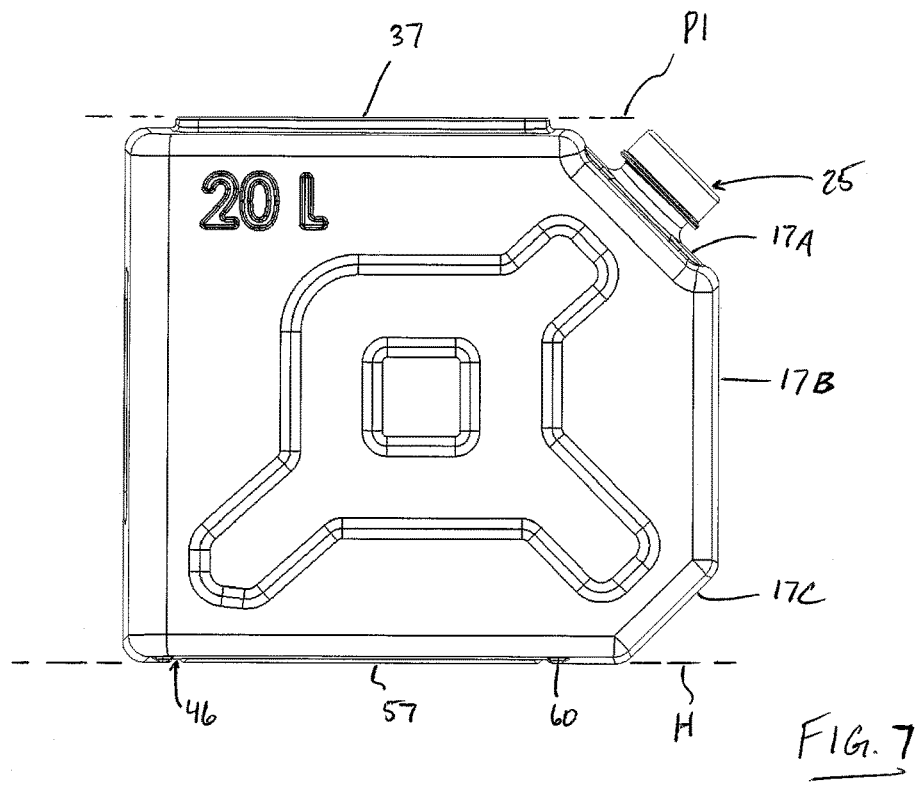
FIG. 7 is an elevation view from a side of the container of FIG. 1.
Figure 8:
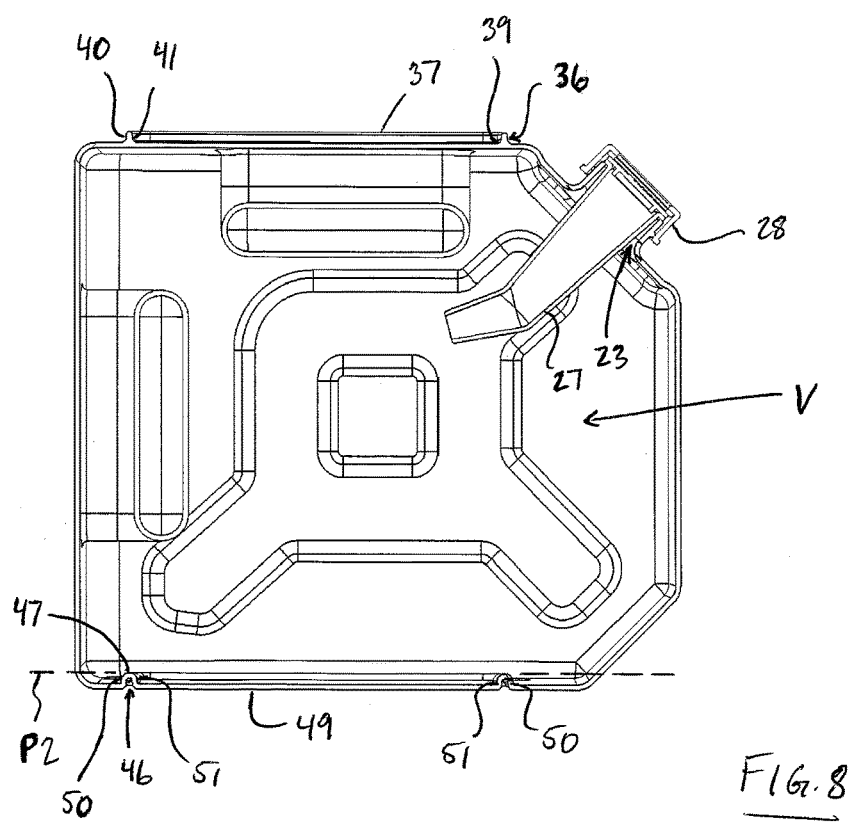
FIG. 8 is a cross-sectional view of the container of FIG. 1 taken along line 8-8 in FIG. 3.
Figure 9:
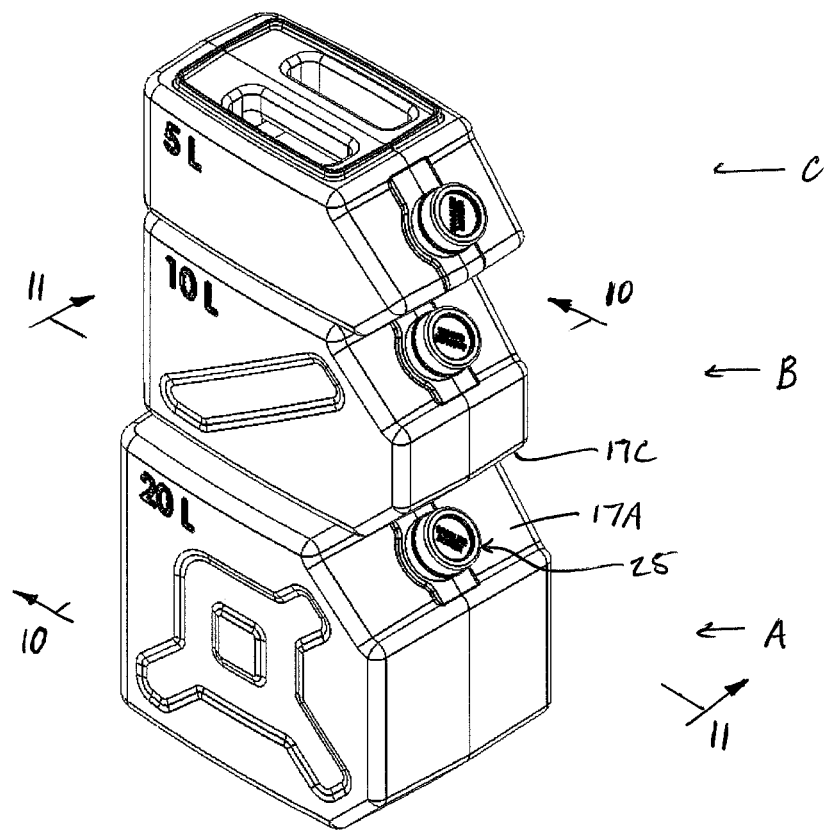
FIG. 9 is a perspective view of a plurality of containers according to the present invention disposed in a vertically stacked configuration.

In FIGS. 1 to 10 is provided a container generally indicated at reference numeral 10 with an arrangement which allows the container to be stacked vertically with another container of the same type. It will be appreciated that although the container of the illustrated arrangement is of a kind for storing fuel such as gasoline, the arrangement providing stacking capability may be applied to containers of different kinds.

Generally speaking, the container 10 comprises a top wall 12, a bottom wall 14, and a plurality of side walls 17-20 spanning between the top and the bottom walls so as to define an interior volume V of the container. There is provided for accessing the interior volume V of the container an opening 23 in the front side wall 17 which is formed in three sections with an upper section 17A inclined relative to the top wall 12, an intermediate section 17B which is oriented substantially vertically, and a lower section 17C which is inclined relative to the bottom wall 14. Thus, more specifically the opening is located in the upper section 17A of the front side wall for reasons which will become more apparent shortly hereinafter.

At the opening 23 there is provided a conventional spout and cap assembly 25 for selectively communicating the interior volume V with an exterior of the container. The assembly 25 includes the spout 27 and the cap 28 arrangeable in a first closed position as shown through the figures where the spout 27 is located in the interior volume of the container and the opening 23 is closed such that the interior volume is not communicated with the exterior of the container, and thus contents stored within the container remains contained therein. The assembly 25 is also arrangeable in a second pouring position (not shown) where the spout is mounted on the cap at the opening in a manner communicating the interior volume with the exterior so that the contents may be evacuated from the interior volume of the container by pouring.

Further, the container comprises at least one handle 29 which in the illustrated arrangement is formed recessed into one of the container walls. That is, the handle is formed in such a manner so that it protrudes inwardly into the interior volume V of the container relative to the container wall at which the handle is located. As such, the respective handle is formed by a U-shaped channel 31 which is open at a first location L1 at the respective wall and at a spaced second location L2 wherebetween there is formed a tubular grip 33 which is flush with an outer surface of the respective container wall. In the illustrated arrangement the container comprises two handles, one handle 29 located centrally at the top wall 12 and another one 30 of the same arrangement located centrally at the rear wall 18 so as to provide two gripping locations which may make handling the container easier than if there were just one handle, especially for pouring.

Turning now to the arrangement providing the stacking ability, the container comprises at its top wall 12 a continuously extending protrusion 36 following a closed annular path about the top wall with a tip 37 of the protrusion spaced from an outer surface 39 of the top wall so as to be raised thereabove and opposite sides 40 and 41 depending downwardly from the tip 37 on either side thereof towards the top wall's outer surface 39.

At the bottom wall 14 there is thus provided a continuously extending groove 46 following a matching closed annular path about the bottom wall with a base 47 recessed from an outer surface 49 of the bottom wall and opposite sides 50 and 51 upstanding from the base 47 so as to extend therefrom on either side of the base towards the bottom wall's outer surface 49.

Thus, the protrusion 36 and the groove 46 each define a stack-interconnecting feature of the respective one of the top wall 12 and the bottom wall 14 for enabling interconnection between one container and the next arranged in the vertically stacked configuration.

Further, in the illustrated arrangement both the protrusion 36 and the groove 46 are endless.

The groove of one container is thus arranged to matingly receive the protrusion of another container in a nesting manner such that the two containers can be interconnected in a vertically stacked configuration.

Figure 10:
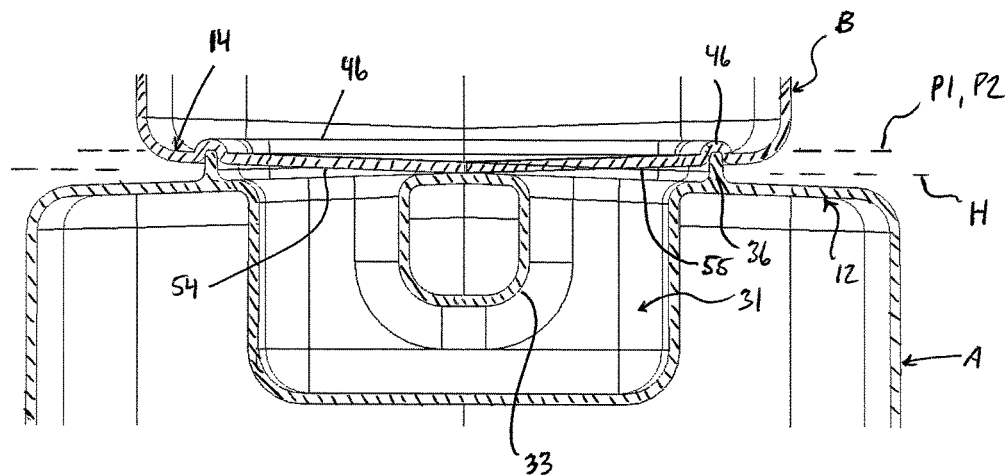
FIG. 10 is a cross-sectional view taken along line 10-10 in FIG. 9.
Figure 11:
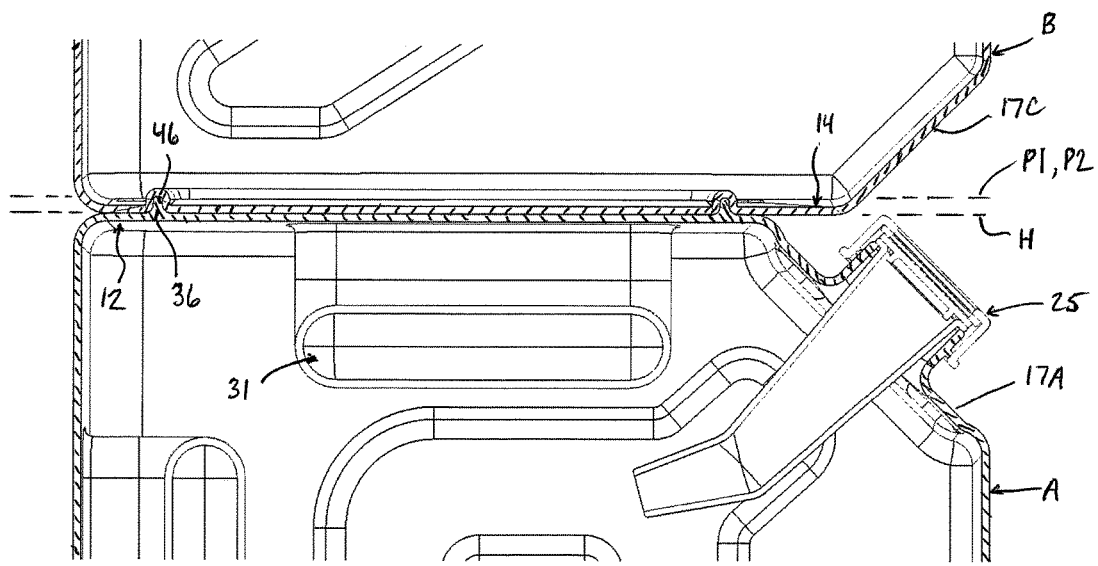
FIG. 11 is a cross-sectional view taken along line 11-11 in FIG. 9.

In order to provide stability, the tip 37 of the protrusion and the base 47 of the groove along a full length thereof following the annular path each define a respective horizontal stacking plane respectively indicated at P1 or P2 which in the vertically stacked configuration is substantially coplanar with the other as best shown in FIGS. 10 and 11. This also allows the vertically stacked configuration of the containers 10 to include more than two containers.

In the illustrated arrangement, the outer surface of each of the top and the bottom walls 12, 14 is inclined at 52, 53 of the top wall and 54, 55 of the bottom wall on either side of a central line extending longitudinally of the bottom wall so as to form a tip along the central line that is indicated at 56 of the top wall and 57 of the bottom wall and which is pointed in the illustrated arrangement.

Figure 12:
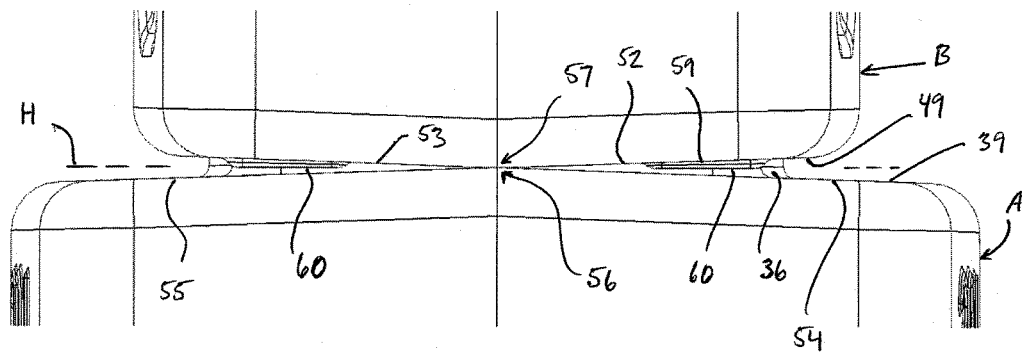
FIG. 12 is an elevation view from the rear of the containers in the vertically stacked configuration of FIG. 9 but showing only two of the stacked containers.

The container includes a plurality of feet 59 which are located at the bottom wall 14 at positions spaced outwardly of the groove 46 in a radial direction from a central area of the bottom wall. The feet 59 have bottoms 60 each forming a flat surface which with the tip 57 of the bottom wall along the tip's full length define a common horizontal plane H. Thus the feet 59 are suited for resting on a support surface such as a room floor. As the feet are spaced transversely outwardly from the bottom wall's tip 57 the feet do not interfere with a container therebeneath in the vertically stacked configuration whose top wall outer surface 39 is inclined downwardly from the tip 56 of the top wall, as more clearly shown in FIG. 12.

Furthermore, since the outer surface of each of the top and bottom walls has inclined portions converging at the tip while the stacking feature defines the respective stacking plane, a height of the protrusion 36 from the top wall's outer surface 39 varies along a length of the protrusion so that the full length of the protrusion's tip is provided at the respective horizontal stacking plane P1, particularly transversely from one side to the other. Similarly, a depth of the groove 46 relative to the bottom wall's outer surface 47 varies along a length of the groove so that the full length of the groove's base is provided at the respective horizontal stacking plane P2.

FIGS. 9 to 12 show a plurality of the containers disposed in the vertically stacked configuration. As most clearly shown in FIG. 9, it is possible to arrange in the stacked configuration the containers indicated at A, B, and C which have different capacities because a footprint of the stacking feature of one of the containers matches that of the container vertically adjacent thereto. In other words, regardless of the capacity of the interior volume of the respective container, each container's stacking features have a common footprint so that containers which have different capacities but not necessarily the same dimensions between every pair of diametrically opposite walls can be disposed in the vertically stacked configuration.

In the illustrated arrangement, the outer surfaces 39, 49 of the top and bottom walls 12, 14 with their inclined portions are held in spaced relation to one another except for at the tips 56, 57 of the top wall 12 of a lower one of the adjacent pair of stacked containers and the bottom wall 14 of an upper one of the adjacent stacked pair.

Further, as more clearly shown in FIG. 11, by locating the opening 23 in the upper inclined section 17A of the front side wall and as the lower section 17C of the front side wall is inclined the opening 23 of the lower one of the adjacent containers in the vertically stacked configuration is still accessible in this stacked configuration.

FIGS. 10 and 11 show that the top wall and the side walls are unitary and that they have substantially uniform wall thickness.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A container comprising:
   a top wall, a bottom wall, and at least one peripheral side wall spanning therebetween, which collectively define an interior volume of the container;
   an opening defined in one of the top wall, the bottom wall and the at least one peripheral side wall for accessing the interior volume of the container;
   a protrusion carried on one of the top wall and the bottom wall with a tip spaced from an outer surface of said one of the top wall and the bottom wall and opposite sides of the protrusion depending from the tip on either side thereof towards the outer surface of said one of the top wall and the bottom wall;
   a groove carried on the other one of the top wall and the bottom wall with a base recessed from an outer surface of said other one of the top wall and the bottom wall and opposite sides of the groove extending from the base on either side thereof towards the outer surface of said other one of the top wall and the bottom wall;
   the groove of a first one of a plurality of the container being arranged for matingly receiving the protrusion of a second one of the plurality of the container such that the first one and the second one of the plurality of the container are interconnectable in a vertically stacked configuration;
   wherein the outer surface of the bottom wall is inclined on either side of a central line extending longitudinally of the bottom wall so as to form a tip along said central line, and the container includes a plurality of feet at the bottom wall on either side of said central line with bottoms of the feet defining a common plane with the tip of the outer surface of the bottom wall;
   wherein the outer surface of the top wall is inclined on either side of a central line extending longitudinally of the top wall so as to form a tip along said central line such that the bottoms of the feet of the first one of the plurality of the container are spaced from the outer surface of the top wall of the second one of the plurality of the container in the vertically stacked configuration.

2. A container comprising:
   a top wall, a bottom wall, and at least one peripheral side wall spanning therebetween in substantially upstanding condition, the top and bottom and at least one peripheral side walls collectively defining an interior volume of the container;

the top wall and the at least one peripheral side wall being unitary;

the top wall and the at least one peripheral side wall having substantially uniform wall thickness;

the bottom wall defining a horizontal plane so as to be adapted for resting on a support surface;

an opening defined in one of the top wall, the bottom wall and the at least one peripheral side wall for accessing the interior volume of the container;

a protrusion carried on one of the top wall and the bottom wall with a tip spaced from an outer surface of said one of the top wall and the bottom wall and opposite sides of the protrusion depending from the tip on either side thereof towards the outer surface of said one of the top wall and the bottom wall;

a groove carried on the other one of the top wall and the bottom wall with a base recessed from an outer surface of said other one of the top wall and the bottom wall and opposite sides of the groove extending from the base on either side thereof towards the outer surface of said other one of the top wall and the bottom wall;

a respective one of the protrusion and the groove which is carried on the bottom wall following a closed annular path about the bottom wall;

a respective one of the protrusion and the groove which is carried on the top wall following a closed annular path about the top wall and being spaced inwardly from where the top wall transitions to the at least one peripheral side wall;

the top wall having opposite inclined portions located on an outer side of the respective one of the protrusion and the groove that is carried on the top wall so as to be located intermediate the respective one of the protrusion and the groove that is carried on the top wall and where the top wall transitions to the at least peripheral side wall;

each one of the opposite inclined portions of the top wall depending downwardly and outwardly from the respective one of the protrusion and the groove that is carried on the top wall to where the top wall transitions to the at least one peripheral side wall;

the groove of a first one of a plurality of the container being arranged for matingly receiving the protrusion of a second one of the plurality of the container such that the first one and the second one of the plurality of the container are interconnectable in a vertically stacked configuration; and in the vertically stacked configuration, the plane defined by the bottom wall for resting on the support surface being spaced from the inclined portions of the top wall thereunder.

3. The container according to claim 2 further including a handle formed in the top wall at a location thereon within the closed annular path of the respective one of the protrusion and the groove that is carried on the top wall.

4. The container according to claim 2 wherein the protrusion is located at the top wall and the groove at the bottom wall.

5. The container according to claim 2 wherein the top wall defines a generally centrally located tip to which the top wall is inclined on an inner side of the respective one of the protrusion and the groove that is carried on the top wall.

6. The container according to claim 5 wherein the bottom wall defines a generally centrally located tip wherefrom the bottom wall is inclined upwardly and outwardly to where the bottom wall transitions to the at least one peripheral side wall, and the tip of the bottom wall is in vertical alignment with the tip of the top wall so that the tips of the top and bottom walls are arranged for butting engagement with one another in the vertically stacked configuration.

7. The container according to claim 2 wherein:
the respective one of the protrusion and the groove that is carried on the bottom wall is spaced inwardly from where the bottom wall transitions to the at least one peripheral side wall;
the bottom wall comprises opposite inclined portions located on an outer side of the respective one of the protrusion and the groove that is carried on the bottom wall so as to be located intermediate the respective one of the protrusion and the groove that is carried on the bottom wall and where the bottom wall transitions to the at least one peripheral side wall; and
each one of the opposite inclined portions of the bottom wall is inclined upwardly and outwardly from the respective one of the protrusion and the groove that is carried on the bottom wall to where the bottom wall transitions to the at least one peripheral side wall.

8. The container according to claim 7 wherein the bottom wall defines a generally centrally located tip to which the bottom wall is inclined on an inner side of the respective one of the protrusion and the groove that is carried on the bottom wall, and wherein the container includes a plurality of feet carried at the bottom wall on the outer side of the respective one of the protrusion and the groove that is carried on the bottom wall, and bottoms of the feet and the tip of the bottom wall lie in the horizontal plane for resting on the support surface.

\* \* \* \* \*